United States Patent [19]

MacDonald et al.

[11] Patent Number: 5,600,733
[45] Date of Patent: Feb. 4, 1997

[54] METHOD FOR LOCATING EYE POINTS ON OBJECTS SUBJECT TO SIZE VARIATIONS

[75] Inventors: Virginia N. MacDonald, Lansdale; Don A. Tran, Perkasie, both of Pa.

[73] Assignee: Kulicke and Soffa Investments, Inc, Wilmington, Del.

[21] Appl. No.: 144,002

[22] Filed: Nov. 1, 1993

[51] Int. Cl.$^6$ .................................................. G06K 9/00
[52] U.S. Cl. ........................ 382/144; 382/197; 382/209; 382/288; 348/190
[58] Field of Search ..................... 382/8, 48, 14, 382/241, 197, 198, 209, 288, 141, 144; 348/190

[56] References Cited

U.S. PATENT DOCUMENTS

| | | | |
|---|---|---|---|
| 4,361,830 | 11/1982 | Honma et al. | 340/146.3 |
| 4,680,802 | 7/1987 | Nishida et al. | 382/141 |
| 4,845,765 | 7/1989 | Juvin et al. | 382/21 |
| 4,853,968 | 8/1989 | Berkin | 382/48 |
| 4,901,362 | 2/1990 | Terzian | 382/199 |
| 5,007,098 | 4/1991 | Kumagai | 382/197 |
| 5,111,516 | 5/1992 | Nakano et al. | 382/14 |
| 5,119,436 | 1/1992 | Holdgrafer | 382/8 |
| 5,136,661 | 8/1992 | Kobayasi et al. | 382/48 |
| 5,185,811 | 2/1993 | Beers et al. | 382/288 |
| 5,189,707 | 2/1993 | Suzuki et al. | 382/288 |
| 5,206,917 | 4/1993 | Ueno et al. | 382/288 |
| 5,220,361 | 1/1993 | Lehmer et al. | 351/226 |
| 5,238,174 | 8/1993 | Ricketson et al. | 228/180.21 |
| 5,245,674 | 9/1993 | Cass et al. | 382/200 |
| 5,251,265 | 10/1993 | Döhle et al. | 382/288 |

OTHER PUBLICATIONS

Model 839–5; Model 836 Pattern Recognition System by Kulicke and Soffa Industries, Inc Pub Jun. 1988.
K & S Model 860 PRS/VLL Handbook© by Kulicke and Soffa Ind. Inc 1992, Willow Grove, PA.
"Shift and Correlate Pattern Recognition for Machine Vision Inspection" by Jon Heywood @pp. 21–25 of May 1987 Computers in Mechanical Engineering.
"A Comparison of Correlation Techniques for Locating Shapes and Patterns in Images" by Larry Schmidt;AISI Tech Report No. 31 (Prior to 1990).

*Primary Examiner*—Joseph Mancuso
*Assistant Examiner*—Bipin Shalwala

[57] ABSTRACT

A novel method for locating eye point features on patterns or objects whose size varies between the reference object and the find object includes generating a set of reference vectors that define the location of the reference eye point. The set of vectors is modified and separated equidistant from each other. A centroid of the object area is calculated. When a fixed object is to be located, an area of certainty is established which contains a plurality of candidate eye points one of which is the proper find eye point of the object to be located. Sets of find vectors are generated for each candidate eye point which are compared with the set vectors for the reference eye point. Centroids of the find objects having the best comparison are calculated and compared with the centroid of the reference object. The candidate eye point having a best vector correlation match and the best centroid comparison is selected as the eye point of the find object.

11 Claims, 2 Drawing Sheets

5,600,733

METHOD FOR LOCATING EYE POINTS ON OBJECTS SUBJECT TO SIZE VARIATIONS

BACKGROUND OF THE INVENTION

1. Field of the Invention

The present invention relates to pattern recognition systems (PRS) and location of a pattern or object after locating a reference teach object whose location is known. More particularly, the present invention comprises a substantially improved method for locating objects whose size varies from the reference teach object.

The present invention is an improvement of a prior art pattern recognition system (PRS) incorporated into Models 1482 and 1484 automatic wire bonder sold by Kulicke and Soffa Industries, Inc. of Willow Grove, Pa.

2. Description of the Prior Art

The present invention is an improvement of a prior art Model 860 pattern recognition system (PRS) incorporated into Models 1482 and 1484 automatic wire bonder sold by Kulicke and Soffa Industries, Inc. of Willow Grove, Pa.

Numerous different types of PRS are in commercial use today. Almost all such systems employ reference characters, reference objects, or reference patterns which are learned by the PRS and stored as electrical signals in analog or digital format.

When the PRS attempts to find or identify an unknown object or pattern, it is sensed in the same way the reference object was sensed to produce electrical signals that may be compared to the reference object signals. These character recognition techniques are over 50 years old and are classified in International Class GO6r, subclass 9/00 plus which corresponds to U.S. Class 382, subclasses 10 and 16 to 30.

When the PRS is employed for both object or pattern recognition and position location, more precise techniques are usually employed. The reference object or reference pattern has a known position which is also stored as electrical signals. The object or pattern to be located is effectively moved until it matches the reference pattern and the amount of movement necessary to effect this match is equal to the displacement of the object being located from the reference object. The use of PRSs to locate the position of an object are over 20 years old and are classified in International Class GO6K, subclass 9/32 plus which corresponds to U.S. Class 382, subclass 8 to 48. While some of the systems are more effective than others, none of the systems provide results which are so reliable that they are compatible with the accuracy required on automatic semiconductor production lines. As an example, during automatic wire bonding, it is necessary to locate eye points or reference points of a chip within a fraction of 1-thousandth of inch which is possible when the pattern on the reference chip and the chips to be wire bonded are the same size. However, the chip is die bonded to a lead frame. The stamped or screen printed lead frames differ greatly in size and it is virtually impossible to locate an identical eye point or reference on successive lead frames which differ one from the other in both size and shape.

It would be desirable to provide a simple and effective method and apparatus for locating eye points or reference points on objects whose size varies from object to object as well as from the reference object.

SUMMARY OF THE INVENTION

It is a principal object of the present invention to provide a novel method for locating objects or patterns using a known PRS.

It is a principal object of the present invention to provide a novel method for locating objects or patterns which differ in size and/or which reside near other similar objects or patterns.

It is a another principal object of the present invention to provide a novel method for locating objects or patterns which includes verification of the eye point being located on objects which differ in size from the reference object.

According to these and other objects of the present invention, there is provided a method for locating eye points on objects subject to size variations. The method is preferably combined into a commercially available K&S Model 860 PRS which employs a plurality of vectors to identify eye points. The vectors are usually generated from a perspective eye point to high contrast edges, then modified so that the heads of the vectors are reduced in number and are distributed approximately equal distanced along the high contrast edges. The high contrast edges are expanded in pixel thickness or width to compensate for object size variations. A center of area, or centroid, of the reference object is calculated in addition to the information which describes the vectors during a teach operation. During the find operation which finds the eye point on an object to be located, candidate eye points are determined by comparing sets of vectors at candidate eye point positions with the reference set of vectors taken from the reference object whose location is known. Centroids for each candidate eye point are calculated and the one candidate eye point whose centroid is closest to the reference object centroid is selected as the eye point of the sought object.

DESCRIPTION OF THE PREFERRED EMBODIMENT

Figure 1:
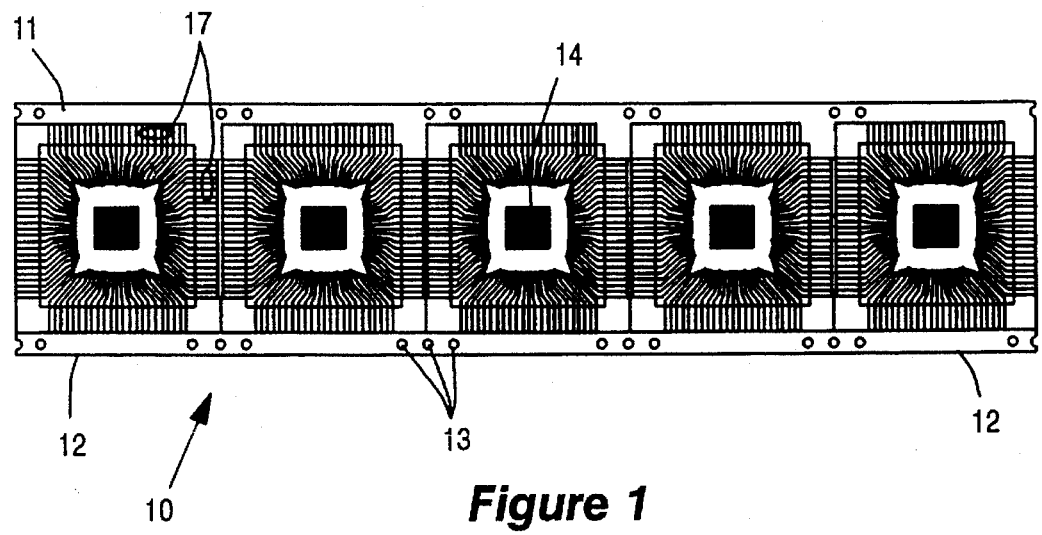
FIG. 1 is a schematic drawing of a thin metal lead frame showing a semiconductor die bonded to the lead frame.

Before describing the present invention illustrated in the drawings, a discussion of terms used hereinafter will follow.

The terms are known by those skilled in the art of automatic wire and die bonders employed vision systems used for locating dies, die contact pads, lead frames, targets on lead frames and carriers.

Targets to be bonded are taught to an automatic bonder by employing a reference device whose position is stored in the memory of a vector correlation pattern recognition system (PRS).

The PRS system of the present invention employs a teach window which is a visually graphic overlay generated by the PRS system and which is superimposed on or over a portion over the image acquired by the video camera of a PRS system of the type described in K&S U.S. Pat. No. 4,441,205.

The preferred method of selecting such operator-selectable teach windows is best described in operator handbooks of the type supplied with automatic die and wire bonders such as "Model 860 PRS/VLL Handbook" copyright July 1992 by Kulicke and Soffa Industries, Inc., Willow Grove, P. 19090.

Such handbooks explain that a teach eye point may be a point or a pattern which is isolated within the teach window or the acquired camera image and are stored in the PRS memory for comparison with eye points of objects which are to be located by the PRS before a bonding operation.

Such handbooks also explain that one way of storing an eye point is in the form of a plurality of vectors that are generated from a point to an edge or contour line of a pattern in the teach window. Thus, for any edge image generated in the teach window, a plurality of vectors having a common tail may be generated having heads which terminate at a line or image edge. The vector tail is arbitrarily chosen and the heads are then defined by the line edges and the spacing between vectors if so defined.

Any reference eye point stored as a plurality of vectors can be compared with a pattern on an object by generating sets of vectors from various tail points within a pattern to be compared with the set of reference vectors. The set of vectors that best compares with the reference vectors identifies the tail of the best matched eye point. This method is known as vector correlation.

The center of an eye point need not be chosen as the tail of a set of vectors, however, when the eye point can be defined by a closed line object, the center of area defined by the image edges has a centroid which further defines the object or set of vectors. The center of an area is calculatable by dividing the areas into two parts contained the same number of pixels in each area. When the dividing line between areas is taken twice or more along orthrogonal lines, the intersection of the dividing lines passes through the center of area or centroid, thus, the centroid is synonymous with the center of an area regardless of its shape.

Center of area commands or calculations are used to locate a center of an area. These commands are well known and are employed in most computer aided design (CAD) programs.

"Teach" eye points are stored in PRS memory where they can be recalled and compared with a set of "find" eye points or vectors. Sets of find vectors are generated from all candidate pixel position where a tail may occur. Thus, plural find eye points which are candidates for a match with the teach eye point vectors are generated during a find operation.

Refer now to FIG. 1 showing a thin metal lead frame 10 having guide edges 11 and 12. The lead frame 10 is also provided with index holes 13 for advancing the lead frame to a position in a work station as will be explained in greater detail hereinafter. The lead frame shown in FIG. 1 has not been wire bonded but is shown having a die 14 mounted on the paddle or die mounting area in the center of each individual pattern of the lead frame 10.

Figure 2:
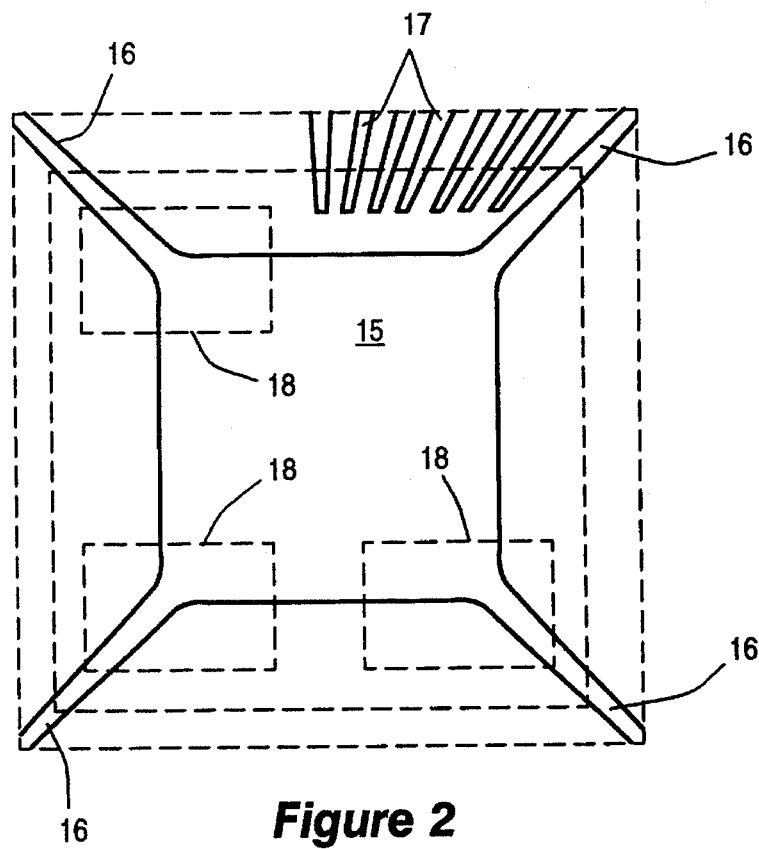
FIG. 2 is an enlarged schematic drawing of a lead frame showing the area on which a semiconductor chip is to be bonded.

Refer now to FIG. 2 showing an enlarged schematic diagram of the area of a single lead frame pattern on which the die 14 would be mounted. The paddle 15 or die mounting area is supported and held in place by tie bars 16 which are an integral part of the lead frame 10. The lead frame 10 is also provided with a plurality of conductive leads 17 which extend to the outer portion of the pattern as best shown in FIG. 1, but are only partially shown in FIG. 2. There is shown in phantom lines an area of interest 18 which may be used to identify a unique feature comprising the die paddle 15 and the tie bar 16 and may be used for establishing eye points. The problem to be described and solved hereinafter is that the size and shape of the die paddle 15 and tie bars 16 tends to vary since such lead frames are made by stamping dies or screen printing which causes variations between the patterns made from the same dies or screens. Further variations occur when such lead frames are purchased from different manufacturers employing different sets of dies or screens.

For purposes of the following explanation, the invention will be explained using vector PRS system techniques such as those employed in PRS systems AIS-3000 and 3500 made by Applied Intelligence Systems, Inc. of Ann Arbor, Mich.

Figure 3A:
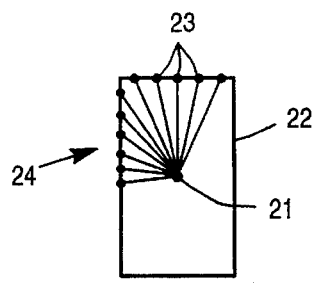
FIG. 3A is a schematic vector diagram of a conventional distribution vector set.

Refer now to FIG. 3A showing a schematic vector diagram of a conventional distribution vector set. As used in this specification a vector set comprises a plurality of vectors having tails at a point 21 and a head located along a high contrast line eye point 22 shown at points 23. The conventional vector set 24 is generated by automatically selecting a point 21 near the center of the closed object 22 and the vector heads 23 are selected along a portion of the edge 22 which has the highest gray scale contrast. Thus, the vector set 24 is usually clumped into a small area or portion of the object area 22. In the conventional system as many as 5000 vectors may be originally selected and are narrowed down to under 50 by selecting the portion of edge 22 which has the highest contrast. This conventional selection method causes the vector set 24 to be highly concentrated and clumped.

Figure 3B:
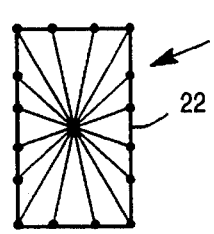
FIG. 3B is a schematic vector diagram of the present invention vector set distribution for a closed line object.

Refer now to FIG. 3B showing a schematic vector diagram of a preferred embodiment vector set 25 which has been distributed substantially uniformly around the closed line object area 22. For an open or a closed object, a large number of vectors are initially generated over a line image then intermediate vectors are eliminated and discarded until fewer than 50 vectors remain which are equally distributed over the line image of the object area 22.

The lines or edges which define an object or pattern for a set of teach vectors may be expanded or fattened, sometimes referred to as morphological dilation. Dilation by one or more pixels is accomplished by redefining a line or edge image to include one or more adjacent pixels contiguous with or to the original edge image or line as shown at edge 37 defined by a pair of parallel lines.

Figure 3C:
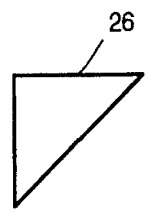
FIGS. 3C and 3D are schematic vector diagrams of different closed line objects which are identifiable by the set of vectors shown in FIG. 3A.
Figure 3D:
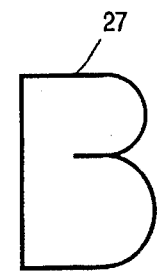

Refer now to FIG. 3C and it will be recognized that the shape 26 comprising high contrast edges may be mistaken for the shape 22 employing the vector set 24 of FIG. 3A. It will be recognized that the vector set 25 does not provide a false recognition of the object area 26.

Refer now to FIGS. 3 A to 3D. The object area 27 introduces the identical problem which exists with the object shape 26 even though it is easily recognized by the human eye as being substantially different. The vector set 24 shown in FIG. 3A will falsely identify the object 27 of FIG. 3D as the same object 22. However, the vector set 25 shown in FIG. 3B will not falsely identify either the object 27 or the object 26.

Figure 4A:
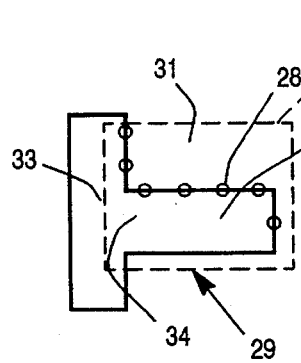
FIG. 4A is a schematic vector diagram of another closed line object showing a preferred distribution of the heads of vectors.

Refer now to FIG. 4A showing a schematic vector diagram of another closed line object 29 having a preferred distribution of the heads of vectors. The vector heads 28 of the shape 29 are not distributed uniformly completely around the closed object 29. Thus, this object illustrates that an open pattern in the teach window may be used to generate a vector set of the type shown in FIG. 3B. Further, the location of the vector tail 31 may be inside or outside of the area 29 in the open figure embodiment, even though the heads are distributed uniformly along a high contrast edge portion as shown. The centroid for the area 29 would occur at a point 34.

Figure 4B:
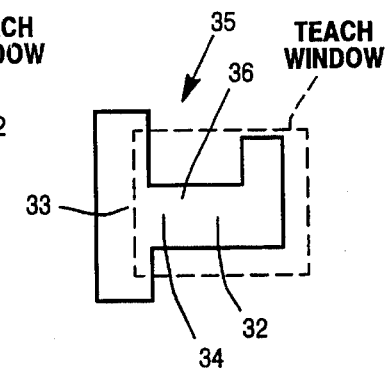
FIG. 4B is a schematic diagram of a different closed line object identifiable by the set of vectors having heads at the point shown in FIG. 4A.

Refer now to FIG. 4B showing a different closed line object 35 having superimposed thereon the numerals from FIG. 4A. The centroid for the object area 29 is shown at point 34. However, the true centroid for the object area 35 will be located at point 36 due to the additional area appended to the right hand side of object area 35. When the objects 29 and 35 are compared by superimposing the heads 28 onto the object 35, it will be apparent that the vector set used to identify the object 29 will also identify the object 35. This is a perfect example to show that the new centroid 36 when compared with the centroid 34 will eliminate false recognition of an object.

Figure 4C:
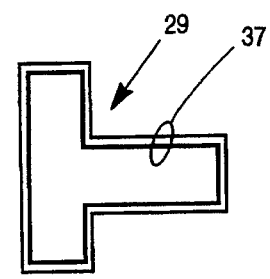
FIG. 4C is a schematic diagram of the closed line object shown in FIG. 4A after the closed lines are expanded.

Refer now to FIG. 4C showing a schematic diagram of the closed line object 29 shown in FIG. 4A after the closed lines are expanded to include a field or area. The reason for expanding the area which encompasses the heads of the vectors is to allow recognition of objects which may be larger than or smaller than the reference object. Thus, the thickness of the pixel lines or width of the edge 37 should be made proportional in pixel width to the expected deviations of the objects to be recognized after teaching the PRS a reference object. It should be noted that in general, line expansion inherently increases the likelihood of false recognition using vector correlation alone.

Figure 5:
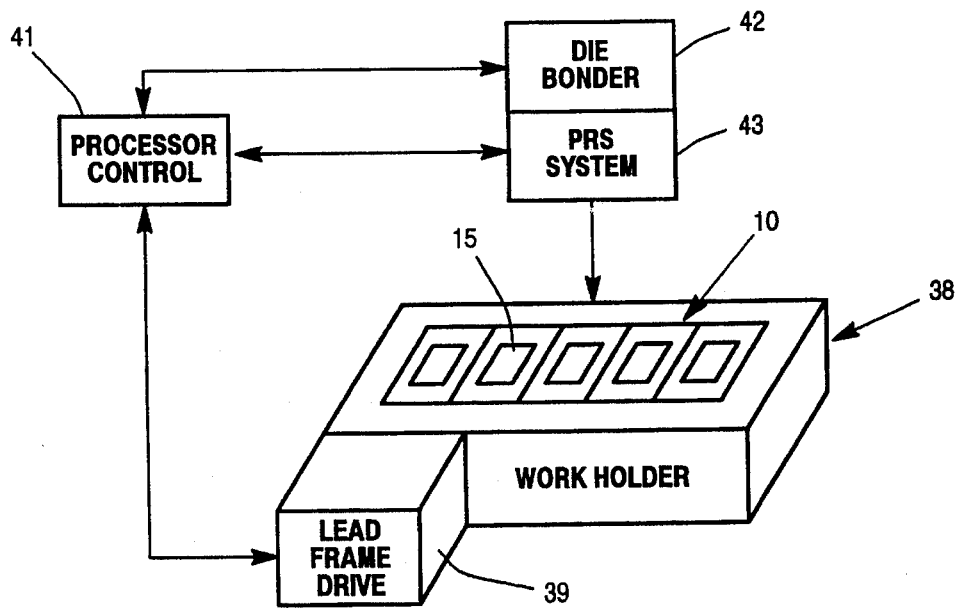
FIG. 5 is a schematic block diagram of a work holder supporting a lead frame opposite a PRS system on a die bonder which is used to illustrate the environment of the present invention.

Refer now FIG. 5 showing a schematic block diagram of a work holder 38 of the type shown in U.S. Pat. No. 5,238,174 and incorporated herein by reference which supports and indexes forward a lead frame 10 by means of a lead frame drive 39 under the control of a processor 41 which is capable of controlling a die bonder 42 which embodies therein as a component a PRS system 43. In a preferred embodiment of the present invention, it is necessary to locate the position of the die paddle 15 in order that the die bonder may correctly place a die or chip 14 precisely and correctly on the die paddle 15. This is achieved by using two or more eye points located in an area of interest 18. Having two precisely located eye points on the paddle 15 determines its exact location and the die bonder head may be positioned relative to the paddle 15 so that a precise position is achieved during die bonding.

The novel method may now be explained with reference to the Figures and numerals described hereinbefore. A lead frame to be die bonded is positioned opposite a video camera of a PRS system and two eye points are taken successively on an object such as a die paddle. This information is stored in the image memory of the PRS system or the central processor described hereinbefore. The information comprises a vector set described by XY positions of their heads and tails. This vector set is then reduced in number by reducing intermediate vectors so as to uniformly distribute the heads of a vector set such as set along the high contrast lines or edges of a shape to be recognized. Assuming that the teach operation places the tail at the center of the teach window 18, it will be recognized that this teach centroid has no direct correlation to the centroid of the area to be recognized. In addition to locating the eye point automatically by a conventional method, it is then important that the teach centroid of the area to be recognized is generated and stored in the computer. For example, the centroid of the object shown in FIG. 2 comprises the area bounded by the lines 18 and the corner of the die paddle 15 and includes a portion of the tie bar 16 inside of the area of interest 18.

During a find operation, an object similar to the object used for the reference object is placed before the PRS system 43 and the die bonder 42 as explained hereinbefore. The displacement of the new object whose position is to be located is not mechanically indexed with enough precision to accurately locate the eye points of the portion of the lead frame to be located. In the preferred embodiment of the present invention, as in the prior art, each of the possible eye points in the image is assumed to be a candidate eye point and a set of vectors is generated for each of the candidate eye points. The vectors for each of the candidate eye points are compared with a set of vectors generated for the reference object. Only those eye points having the highest correlation values are the only remaining candidate eye points used for selection as the proper eye point. Knowing that it is possible to have a plurality of selected candidates for eye points, the computer now generates a centroid of the object defined by the selected candidate eye points. Then the centroids of the selected candidate eye points are compared with the centroid of the reference object and only one selected candidate eye point will have its find centroid that most closely matches with the teach centroid of the reference eye point and this is the eye point that is deemed to be the sought object's eyepoint.

Having explained a preferred embodiment of the present invention, it will now be appreciated that the object in the area of interest 18 can either expand or contract radially from its centroid without displacing its centroid in a manner analogous to isotropic expansion. It has been found that using the present system to locate eye points on lead frames which differ in size, that the number of recognition errors has been reduced by a factor of 40:1.

Having explained the present invention using a commercially available vector correlation PRS system, and a known typical die bonder operation, it will be understood that the same invention may be employed in its present direct form in a wire bonder. Ordinarily, the pads and features on a reference die and a die to be located are so precise that the problem of size variation does not exist. However, when a large number of similar objects are located on a die and it is necessary to distinguish one object from another, the present invention may be employed for that purpose alone.

Since the same PRS system used on wire and die bonders are employed on automatic wafer saws, when a problem arises similar to that described hereinbefore with reference to a die bonder or a wire bonder exists, the present invention may be used to eliminate false recognition of objects.

While the present invention is principally designed for use in the semiconductor industry in automatic wire bonders, die bonders and wafer saws, it is not so restricted and may be used for locating objects that have variation in size from the reference object. The present invention may also be used to differentiate objects which are so similar that false recognition could occur with conventional vector correlation systems.

What is claimed is:

1. A method for locating eye points on lead frame like objects that are subject to size variations, comprising the steps of:

acquiring a video camera image of a reference object having a known position in a PRS system, isolating a teach window area in the camera image field which contains a reference object or eye point, generating an edge image of interconnected pixel lines at high contrast edge portions of said reference object, said pixel lines being selected to define unique object shape and eye point, generating a teach eye point in said teach window whose taught location is arbitrarily defined as the center of the teach window, generating a large number of teach vectors between said teach eye point and said edge image of said interconnecting pixel lines, reducing the large number of teach vectors by eliminating some of the large number of vectors to provide a reduced set of teach vectors having a common tail at said teach eye point and heads which are spaced uniformly along said interconnected pixel lines of said unique object shape, storing said teach eye point and said set of teach vectors which define the location of the teach object shape relative to the video camera, acquiring a video camera image of a find object to be located relative to said video camera, generating interconnected pixel lines at high contrast edge portions of said find object, generating sets of find vectors from vector candidate eye points in said image of said find object, comparing said stored teach vectors with said sets of find vectors, scoring the find vectors that compare best with said teach vectors, selecting only the candidate eye points having the highest scores, comparing the selected candidate eye points with the teach eye point, and selecting the one candidate eye point which is closest to the teach eye point as the accurate X-Y position eye point of the find object.

2. The method as set forth in claim 1 which further includes the steps of:

generating a teach centroid representative of a center of area of the reference object, generating a find centroid representative of the center of area of the selected find candidate eye points, and wherein the steps of evaluating candidate eye points comprises comparing centroids of candidate eye points with that of the teach eyepoints, and wherein the step of selecting the candidate eye point of the find object being sought comprises selecting the candidate eye point whose centroid is closest to the teach centroid.

3. The method as set forth in claim 1 wherein the step of generating interconnected pixel lines comprises generating pixel lines having a thickness greater than one pixel.

4. The method as set forth in claim 3 wherein the step of generating pixel lines comprises generating pixel lines having a thickness related to said size variation of said object to be located.

5. The method as set forth in claim 4 wherein the step of generating sets of find vectors comprises generating tails of vectors at the pixel locations of candidate eye points and generating heads of candidate vectors at distances and at directions which coincide with the teach vectors.

6. A method as set forth in claim 1 wherein the step of generating sets of find vectors comprises generating tails of vectors at the pixel of candidate eye points and extending the vectors in the direction which coincides with the teach vectors.

7. A method as set forth in claim 6 wherein the step of generating sets of find vectors further includes extending a find vector until it coincides with the interconnected pixel edge lines.

8. A method as set forth in claim 7 wherein the step of comparing teach vectors with find vectors further comprises the step of establishing a range of error for the length of a find vector.

9. A method for locating eye points on lead frame like objects subject to size variation, comprising the steps of:

establishing a range of size variations of the objects, storing a pixel map of a reference object which contains a reference eye point in a PRS system, storing a centroid location of said reference object, generating a set of reference vectors which defines the location of said reference object, replacing the reference object with a find object to be located, storing a pixel map of the find object to be located, generating a set of find vectors for each candidate eye point in the pixel map of the find object, comparing each set of find vectors with said reference vectors, scoring each set of find vectors for coincidence with said reference vectors, selecting the candidate eye points having the highest scores for coincidence, generating a centroid of a find object for each selected candidate eye point, comparing the centroids of said find object with the centroid of the reference object, and selecting the candidate eye point of the find object being sought whose centroid most closely matches the centroid of the reference object.

10. A method as set forth in claim 9 which further includes the step of generating the centroid of the reference object by computing the center of area of the reference object definable by scanning said pixel map.

11. A method as set forth in claim 9 which further includes the step of generating the centroid of the reference object by computing a location on the reference object which is indicative of a repeatable feature on said reference object.

* * * * *